United States Patent [19]

Sawada

[11] Patent Number: 5,307,298
[45] Date of Patent: Apr. 26, 1994

[54] SEMICONDUCTOR INTEGRATED CIRCUIT DEVICE FOR LINEAR QUANTIZATION AND INVERSE QUANTIZATION

[75] Inventor: Akira Sawada, Tokyo, Japan
[73] Assignee: NEC Corporation, Tokyo, Japan
[21] Appl. No.: 24,081
[22] Filed: Mar. 1, 1993
[30] Foreign Application Priority Data Feb. 28, 1992 [JP] Japan .................................. 4-42610

[51] Int. Cl.⁵ ............................................. G06F 7/38
[52] U.S. Cl. ............................................. 364/715.01
[58] Field of Search ............... 358/133, 135, 136, 138; 364/715.01, 715.02, 724.1, 715.08

[56] References Cited

U.S. PATENT DOCUMENTS

| | | | |
|---|---|---|---|
| 4,722,002 | 1/1988 | Mochizuki | 358/133 |
| 5,095,366 | 3/1992 | Ishikawa | 358/136 |
| 5,113,255 | 5/1992 | Nagata et al. | 358/136 |
| 5,144,428 | 9/1992 | Okuda et al. | 358/136 |

*Primary Examiner*—Jerry Smith
*Assistant Examiner*—Emmanuel L. Moise
*Attorney, Agent, or Firm*—Foley & Lardner

[57] ABSTRACT

A linear quantizer/ inverse quantizer comprises a first shifter coupled with a data input port for dividing the value indicated by an m-bit input data signal by two for producing a first digital output signal, a multiplier for multiplying the value of an m-bit input data signal by a coefficient indicated by lower (n−2) bits of an n-bit digital code signal two bits wider than a standard digital code signal theoretically required for the linear quantization, a second shifter for dividing the product by four for producing a second digital output signal indicative of the quarter of the product, and a selector unit having three input ports respectively supplied with the m-bit input data signal, the first digital output signal and the second digital output signal, and the selector unit is responsive to the higher two bits of the n-bit digital code signal for selectively coupling the three input ports with an output port thereof so that division is replaced with multiplication without deterioration of accuracy.

5 Claims, 4 Drawing Sheets

SEMICONDUCTOR INTEGRATED CIRCUIT DEVICE FOR LINEAR QUANTIZATION AND INVERSE QUANTIZATION

FIELD OF THE INVENTION

This invention relates to a semiconductor integrated circuit device and, more particularly, to a semiconductor integrated circuit device for quantization/ inverse quantization.

DESCRIPTION OF THE RELATED ART

The prior art quantizer/ inverse quantizer incorporated in the semiconductor integrated circuit device achieves the linear quantization/ inverse quantization through division/ multiplication or through multiplication only, and FIG. 1 illustrates a typical example of the semiconductor integrated circuit device for image processing. The prior art semiconductor integrated circuit device largely comprises a switching circuit 1, a discrete signal transformer 2 and a quantizer/ inverse quantizer 3, and the quantizer/ inverse quantizer 3 achieves the linear quantization/ inverse quantization through division/multiplication.

While coding an input digital image signal, an input port IN is coupled through the switching circuit 1 with the discrete cosine transformer 2, and a set of digital image signals Din are sequentially applied to the input port IN. The set of digital image signals Din are indicative of an image in a predetermined unit area on a screen such as, for example, $8 \times 8$ pixels. The digital image signals Din are treated by the discrete cosine transformer 2,, and the discrete cosine transformer 2 produces the same number of output data signals indicative of the frequency components.

The discrete cosine transformer 2 is coupled with the linear quantizer/ inverse quantizer 3, and the linear quantizer/ inverse quantizer 3 comprises a divider 3a, a multiplier 3b and a memory unit 3c for storing quantize coefficients. The output data signals indicative of the frequency components are supplied to the divider 3a and provide dividends to the divider 3a. The memory unit 3c supplies divisors to the divider 3a, and the dividends are respectively divided by the divisors. A part of each quotient indicative of an integer is delivered as an output digital code signal Sout.

On the other hand, when an input digital code signal Sin is decoded by the linear quantizer/ inverse quantizer, the switching unit 1 couples the port b with the port c. A set of input digital code signals are sequentially supplied to the linear quantizer/ inverse quantizer 3, and provide multiplicands to the multiplier 3b. The memory unit 3c supplies multipliers in synchronism with the input digital code signals, and the products are supplied through the switching unit 1 to the discrete cosine transformer 2. The products are treated by the discrete cosine transformer 2, and are delivered therefrom as a set of output image signals Dout.

FIG. 2 illustrates another example of the semiconductor integrated circuit device for the signal processing, and the linear quantization/ inverse quantization is achieved through multiplication only. This is because of the fact that the division is equivalent to the multiplication with the inverse of a multiplier, and the multipliers are changed between the coding operation and the decoding operation. In this instance, the linear quantizer/ inverse quantizer 3 is replaced with the combination of a switching element 4 and a linear quantizer/ inverse quantizer 5, and the linear quantizer 5 comprises a multiplier 5a and a rewritable memory unit 5b.

While the semiconductor integrated circuit device codes input image signals Sin to output digital code signals, the switching unit 4 couples the discrete cosine transformer 2 with the multiplier 5a, and each output data signal of the discrete cosine transformer 2 is multiplied by the inverse of a quantize coefficient read out from the memory unit 5b.

On the other hand, when input digital code signals are decoded, the quantize coefficients in the memory unit 5b are rewritten, and the switching unit 4 supplies the input digital code signals to the multiplier 5a. The quantize coefficients are sequentially read out from the memory unit 5b, and the multiplier 5a repeats multiplying operation on the input digital code signal and the quantize coefficient without any inversion. The multiplier 5a supplies the products through the switching unit 1 to the discrete cosine transformer 2, and the discrete cosine transformer 2 produces output image signals Dout.

Thus, the second example achieves the linear quantization/ inverse quantization through multiplication only. However, it is necessary to rewrite the quantize coefficients between the coding operation and the decoding operation. Moreover, in order to keep the accuracy, it is necessary for multiplication instead of division to increase the digits of each coefficient. In this instance, each quantize coefficient consists of eight digits for the decoding operation, and each coefficient is increased to twelve digits for the coding operation.

Either prior art linear quantizer/ inverse quantizer needs a multiplier, and the circuit configurations of the multiplier are broken down into two categories. The multiplier of the first category is implemented by a parallel combination of adders equal to the digits of the quantize coefficient minus one, and each of the adders has the digits equal to the digits of an input digital code serving as the multiplicand. The multiplier of the second category has only one adder forming a part of a data propagation loop, and the single adder repeats addition.

The multiplier of the first category is desirable for high speed operation. However, the circuit scale is larger than the multiplier of the second category. For this reason, if the real estate of a semiconductor chip is large enough to fabricate the semiconductor integrated circuit device, the multiplier may be fabricated from the parallel combination of adders. On the other hand, if high-speed transistors are available for the semiconductor integrated circuit device and/ or the multiplication can be completed through addition repeated a small number of times, the single adder may be used for the multiplier.

In this situation, the first prior art example has a problem in that the only one of the multiplier and the divider is busy in the liner quantization/ inverse quantization, and the other stands idle. Therefore, the first prior art example is uneconomical. The second prior art example is desirable in view of economics. However, the second prior art example encounters a problem in that a large memory unit is required for storing the quantize coefficients longer than that of the first prior art example for keeping the accuracy. Therefore, the prior art semiconductor integrated circuit device for the linear quantization/ inverse quantization suffer from either large-sized component circuit, i.e., the multiplier/divider or the memory unit.

Moreover, the prior art examples of the linear quantizer/ inverse quantizer have a trade-off between the scale and the operation speed. Namely, if the quantize coefficient consists of larger number of bits, the first prior art example needs to increase the number of adders; however, the operation speed is less affectable by the increment of the bits. On the other hand, the second prior art example copes with the increased bits by repeating the addition. For this reason, even if the bits of the quantize coefficient are increased, the second prior art is not enlarged; however, large amount of time is consumed for completing the multiplication.

SUMMARY OF THE INVENTION

It is therefore an important object of the present invention to provide a semiconductor integrated circuit device for the linear quantization and inverse quantization which is free from the problems inherent in the prior art examples.

To accomplish the object, the present invention proposes to allow higher bits of a digital code indicative of an expanded coefficient to select calculation results.

In accordance with one aspect of the present invention, there is provided a semiconductor integrated circuit device for a linear quantization and an inverse quantization selectively entering a coding phase and a decoding phase of operation, comprising: a) a first shifter coupled with a data input port, and operative to divide the value indicated by an m-bit input data signal at the data input port by two for producing a first digital output signal indicative of the half of the value; b) a multiplier having a first input port supplied with the m-bit input data signal and a second input port supplied with lower $(n-2)$ bits of an n-bit digital code signal indicative of a coefficient, and operative to multiply the value indicated by the m-bit input data signal by a multiplier indicated by the lower $(n-2)$ bits, the n-bit digital code signal in the coding phase being at least two bits wider than a standard digital code signal indicative of a theoretical quantize coefficient used in the decoding phase, higher two bits of the digital code signal being indicative of "0" in the decoding phase; c) a second shifter coupled with the multiplier, and operative to divide the product of the multiplication carried out by the multiplier by four for producing a second digital output signal indicative of the quarter of the product; and d) a selector unit having three input ports respectively coupled with the data input port, the first shifter and the second shifter, and responsive to the higher two bits of the n-bit digital code signal for selectively coupling the three input ports with an output port thereof, the selector unit being operative to transfer the m-bit input data signal to the output port when only the highest data bit of the higher two bits is indicative of "1", the selector unit being operative to transfer the first digital output signal to the output port when only the other of the higher two bits is indicative of "1", the selector unit being operative to transfer the second digital output signal to the output port when both higher two bits are indicative of "0".

In accordance with another aspect of the present invention, there is provided a

BRIEF DESCRIPTION OF THE DRAWINGS

The features and advantages of the semiconductor integrated circuit device for the linear quantization/inverse quantization according to the present invention will be more clearly understood from the following description taken in conjunction with the accompanying drawings in which.

DESCRIPTION OF THE PREFERRED EMBODIMENTS

First Embodiment

Figure 1:
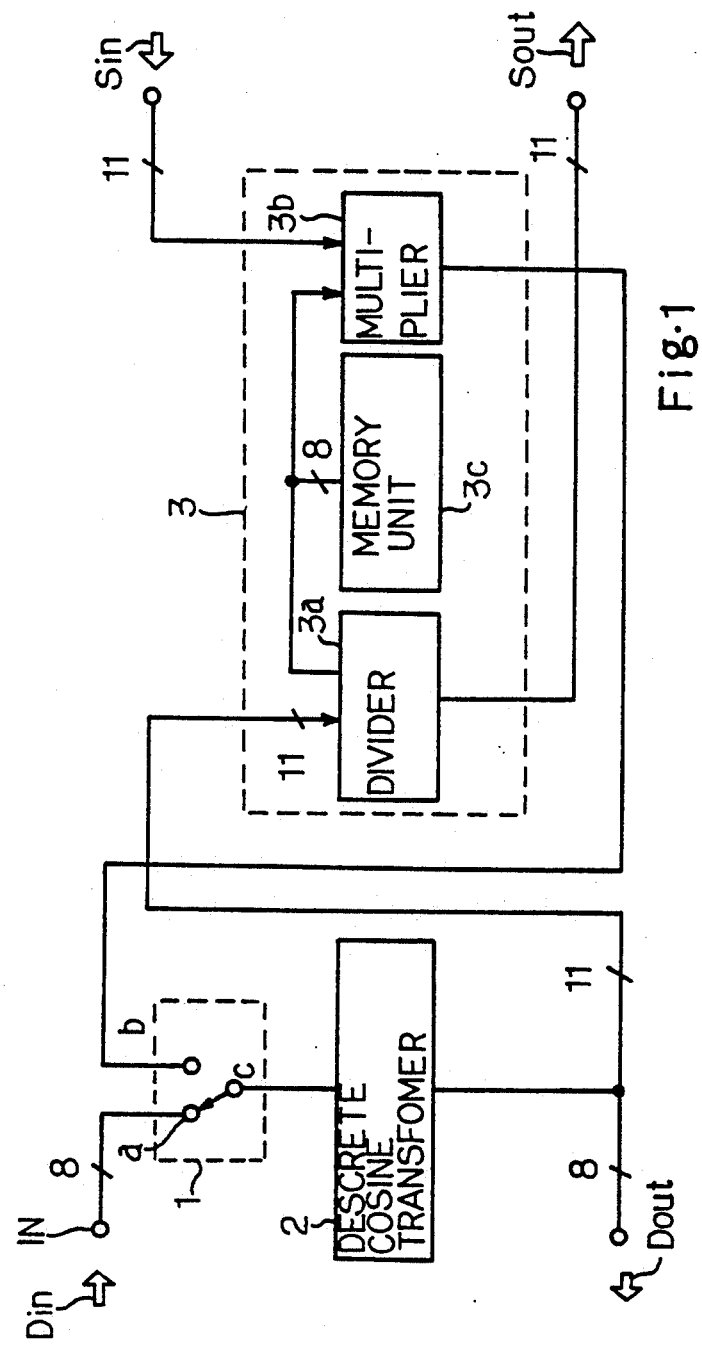
FIG. 1 is a block diagram showing the first prior art integrated circuit device for the signal processing.
Figure 2:
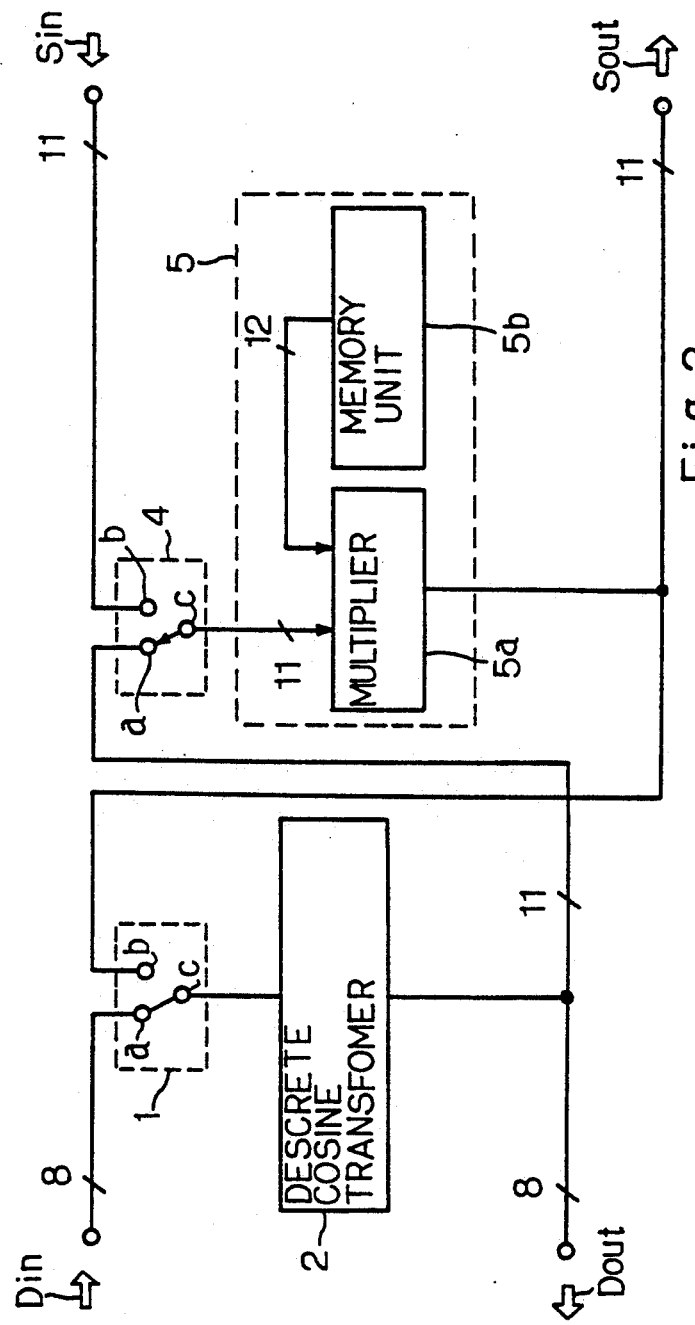
FIG. 2 is a block diagram showing the second prior art integrated circuit for the signal processing.
Figure 3:
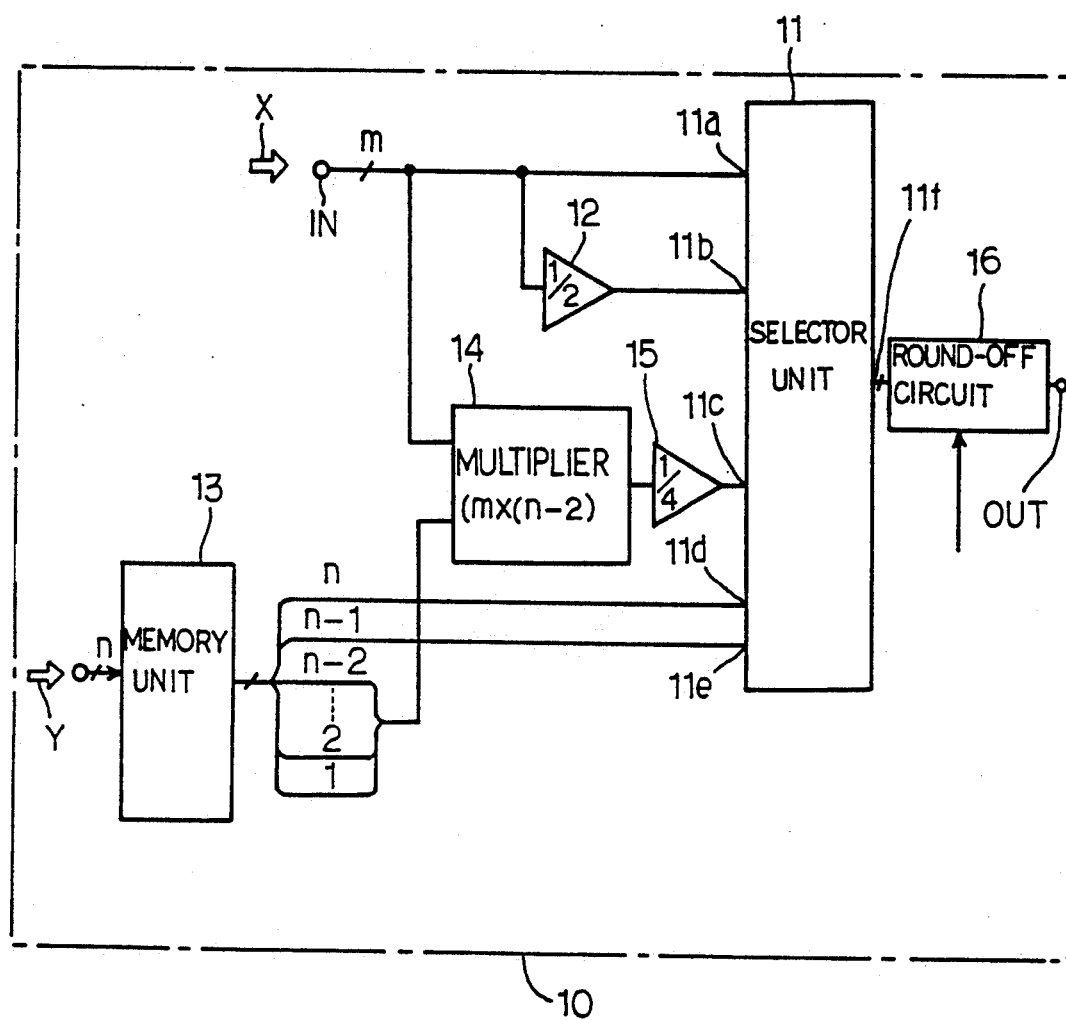
FIG. 3 is a block diagram showing a semiconductor integrated circuit device for a linear quantization and inverse quantization according to the present invention.

Referring to FIG. 3 of the drawings, a semiconductor integrated circuit device is fabricated on a single semiconductor chip for a linear quantization and an inverse quantization, and comprises a selector unit 11, a first shifter 12, a memory unit 13, a multiplier 14, a second shifter 15 and a round-off circuit 16. If the semiconductor integrated circuit device implementing the first embodiment forms a part of a signal processing unit corresponding to that shown in FIG. 2, a discrete cosine transformer and switching units are coupled therewith as similar to the discrete cosine transformer 2 and the switching units 1 and 4.

The selector unit 11 has three input ports 11a, 11b and 11c, and is responsive to the control bits n and $(n-1)$ at the control nodes 11d and 11e thereof for coupling one of the input ports 11a to 11c with the output port 11f thereof. The three input ports 11a to 11c are respectively coupled with a data input port IN, the first shifter 12 and the second shifter 15.

An m-bit input data signal is applied to the data input port IN, and is distributed to the input port 11a, the first shifter 12 and the multiplier 14. The shifter 12 is implemented by a wiring arrangement for shifting the input data signal by one bit toward the least significant bit so that the value of the input data signal is divided by two without any active circuit component. The output signal of the first shifter 12 is supplied to the second input port 11b of the selector unit 11.

The memory unit 13 is supplied with n-bit digital code signals Y, and memorizes coefficients represented by the n-bit digital code signals Y in rewritable manner. Each of the digital code signals Y is two bits wider than a standard digital code signal indicative of a theoretical quantize coefficient. The digital code signal Y may be more than two bits wider than the standard digital code signal indicative of the quantize coefficient. When the n-bit digital code signals Y are respectively indicative of inverses of multipliers, the most significant bit of the n-bit digital code signal is indicative of the first place of an integral part of the coefficient, and the lower order bits are indicative of the decimal below the decimal point.

The n-bit digital code signals Y are selectively read out from the memory unit 13, and the highest two bits n and $(n-1)$ of the n-bit digital code signal Y are supplied to the control nodes 11d and 11e of the selector unit 11. The other bits $(n-2)$ to 1 are supplied to the multiplier 14, and the m-bit input data signal is multiplied by the multiplier indicated by the (n−2) bits. The digital output signal indicative of the product is supplied to the second shifter 15, and is shifted by two bits toward the least significant bit so that the digital output signal of the shifter 15 is indicative of a quarter of the product. The second shifter 15 is also implemented by a wiring arrangement without any active circuit component, and the second shifter 15 supplies the digital output signal to the third input port 11c of the selector unit 11.

The selector unit 11 is responsive to the higher two bits n and (n−1) of the digital code signal Y read out from the memory unit 13, and selectively couples the input ports 11a, 11b and 11c to the output port 11f thereof. Namely, If the most significant bit n and the higher bit (n−1) are respectively "1" and "0", the selector unit 11 couples the first input port 11a with the output port 11f. When the most significant bit n and the higher bit (n−1) are respectively "0" and "1", the selector unit 11 couples the second input port 11b with the output port 11f. However, the third input port 11c is coupled with the output port 11f in the co-presence of the bits n and (n−1) of "0" level.

The round-off circuit 16 is coupled with the output port 11f, and is operative to produce a digital output signal OUT indicative of the integral part of the value supplied from the selector unit 11.

The semiconductor integrated circuit device thus arranged selectively carries out a coding operation and a decoding operation. While carrying out a coding operation, the digital code signal Y read out from the memory unit 13 has the most significant bit of "1" if the coefficient is indicative of 1. With the most significant bit of "1", the m-bit input data signal is equivalent to the product calculated by using the coefficient of "1", and the selector unit 11 passes the m-bit input data signal to the output port 11f. If the digital code signal Y read out from the memory unit 13 is indicative of "2", the bit (n−1) is "1", and the selector unit 11 allows the digital output signal of the first shifter 12 to pass therethrough to the output port 11f. However, if both n and (n−1) bits are "0", the selector unit 11 transfers the digital output signal indicative of the product from the second shifter 15 to the output port 11f.

The signal at the output port 11f is supplied to the round-off circuit 16, and the round-off circuit 16 rounds off the value indicated by the signal, thereby producing an output signal OUT indicative of the integral part of the value.

However, when carrying out a decoding operation, the semiconductor integrated circuit rewrites the contents of the memory unit 13, and the contents are theoretical quantize coefficients. For this reason, the digital code signal Y read out from the memory unit 13 is two bits wider than those used in the coding operation, and the higher bits n and (n−1) of each digital code signal Y are "0" at all times. Therefore, the selector unit 11 selects the third input port 11c only, and the m-bit input data signal is multiplied by the quantize coefficient. The product does not contain any decimal point, and the least significant bit is assigned to the first place of the integral part. For this reason, the round-off circuit 16 does not treat the digital signal at the output port 11f, and the output signal OUT is indicative of a quarter of the product.

As will be appreciated from the foregoing description, the linear quantizer/ inverse quantizer according to the present invention uses the selector unit 11 instead of adder for additional bits of an digital code signal Y indicative of an inverse, and the circuit arrangement becomes simple without sacrifice of operation speed.

Second Embodiment

Figure 4:
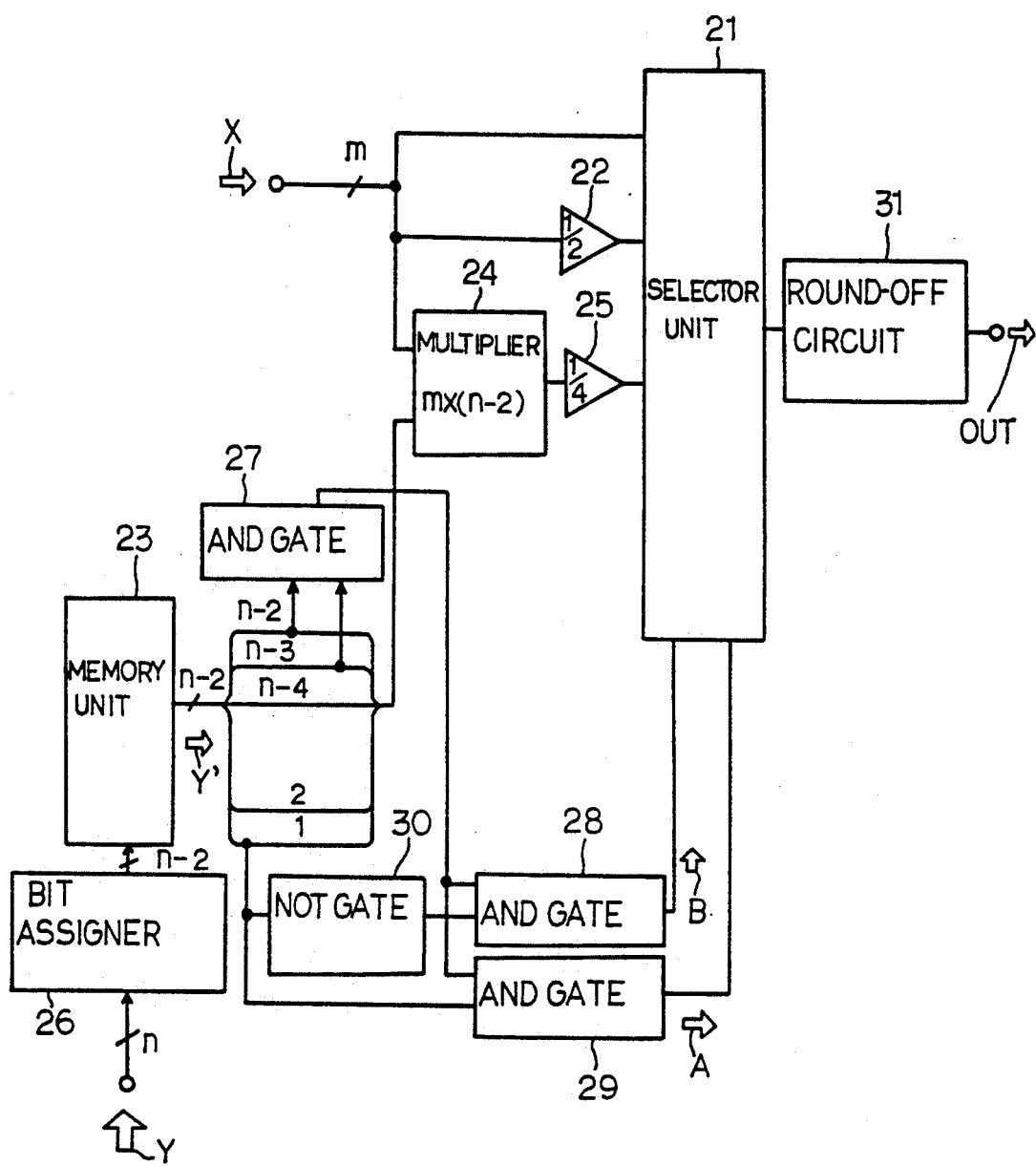
FIG. 4 is a block diagram showing another semiconductor integrated circuit device for the linear quantization and inverse quantization according to the present invention.

Turning to FIG. 4 of the drawings, another semiconductor integrated circuit device embodying the present invention largely comprises a selector unit 21, a first shifter 22, a memory unit 23, a multiplier 24, a second shifter 25, a bit assigner 26, AND gates 27 to 29, a NOT gate 30 and a round-off circuit 31. The selector unit 21, the first shifter 22, the memory unit 23, the multiplier 24, the second shifter 25 and the round-off circuit 31 correspond to the selector unit 11, the first shifter 12, the memory unit 13, the multiplier 14, the second shifter 15 and the round-off circuit 16, and no further description is incorporated hereinbelow.

The bit assigner 26 is operative to assign n bits of a digital code signal Y to (n−2) bits of a modified digital code signal Y', and the modified digital code signal Y' is at least two bits wider than a standard digital code signal indicative of a quantize coefficient. Namely, if the digital code signal Y has the higher bits n and (n−1) of "0", the bit assigner assigns the bits (n−2) to 1 of the digital code signal Y to the bits (n−2) to 1 of the modified digital code signal Y'. If the most significant bit n is "1", the bit assigner 26 assigns "1", to the bits (n−2), (n−3) and 1 of the modified digital code signal Y', and an appropriate data code is assigned to the other bits (n−4) to 2 of the modified digital code signal Y'. If the bit (n−1) of the digital code signal Y is "1", the bit assigner 26 assigns "1" and "0" to the bits (n−2) and (n−3) and the bit 1, and an appropriate data code is assigned to the other bits (n−4) to 2.

The higher two bits (n−2) and (n−3) of the modified digital code signal Y' are supplied to the AND gate 27, and the least significant bit 1 is supplied to the AND gate 29 and the NOT gate 30. The NOT gate 30 supplies the complementary bit of the least significant bit to the AND gate 28, and the AND gate 27 supplies the result of the AND operation to the AND gates 28 and 29. The AND gates 28 and 29 yield the control bit B of "0" and the control bit A of "1" through the logical sequence only when the most significant bit (n−2) and, accordingly, the quantize coefficient are "1". Therefore, the selector unit 21 transfers the m-bit input data signal to the round-off circuit. If the bit (n−3) is "1" and the quantize coefficient is "2", the AND gates 28 and 29 produces the control bit B of "1" and the control bit A of "0", and the selector unit 21 transfers the digital output signal of the shifter 22 to the round-off circuit 31. However, the other combinations causes the AND gates 28 and 29 to produce the control bits A and B of "0", and the selector unit 21 transfers the digital output signal from the shifter 25 to the round-off circuit 31.

In this instance, the least significant bit of the modified digital code signal Y' is indicative of the value "1" or "2" of the coefficient. However, any other bit or bits except for the higher bits (n−2) and (n−3) are available for the value.

Moreover, the bit assigner 26 may be implemented by a microprocessor, and the microprocessor produces the modified digital code signal Y' from the digital code signal Y. Namely, if the coefficient is equal to or greater than 3, the microprocessor calculates the inverse of the coefficient, and extracts the lower (n−2) bits. On the other hand, if the coefficient is equal to or less than two, "1" is assigned to (n−2) bit and (n−3) bit. The modified digital codes thus produced are used in the coding operation.

The memory unit 23 is smaller than the memory unit 13, and the second embodiment is economical rather than the first embodiment.

Although particular embodiments of the present invention have been shown and described, it will be obvious to those skilled in the art that various changes and modifications may be made without departing from the spirit and scope of the present invention. For example, the circuit for the liner quantization/ inverse quantization may be incorporated in a large scale integrated circuit fabricated on a single semiconductor chip or a single rigid circuit board.

What is claimed is:

1. A semiconductor integrated circuit device for a linear quantization and an inverse quantization selectively entering a coding phase and a decoding phase of operation, comprising:
   a) a first shifter coupled with a data input port, and operative to divide the value indicated by an m-bit input data signal at said data input port by two for producing a first digital output signal indicative of the half of said value;
   b) a multiplier having a first input port supplied with said m-bit input data signal and a second input port supplied with lower (n−2) bits of an n-bit digital code signal indicative of a coefficient, and operative to multiply the value indicated by said m-bit input data signal by a multiplier indicated by said lower (n−2) bits, said n-bit digital code signal in said coding phase being at least two bits wider than a standard digital code signal indicative of a theoretical quantize coefficient used in said decoding phase, higher two bits of said digital code signal being indicative of "0" in said decoding phase;
   c) a second shifter coupled with said multiplier, and operative to divide the product of the multiplication carried out by said multiplier by four for producing a second digital output signal indicative of the quarter of said product; and
   d) a selector unit having three input ports respectively coupled with said data input port, said first shifter and said second shifter, and responsive to the higher two bits of said n-bit digital code signal for selectively coupling said three input ports with an output port thereof, said selector unit being operative to transfer said m-bit input data signal to said output port when only the highest data bit of said higher two bits is indicative of "1", said selector unit being operative to transfer said first digital output signal to said output port when only the other of said higher two bits is indicative of "1", said selector unit being operative to transfer said second digital output signal to said output port when both higher two bits are indicative of "0".

2. A semiconductor integrated circuit device as set forth in claim 1, in which said first shifter is implemented by wirings arranged in such a manner that the most significant bit to the second bit next to the least significant bit of said m-bit input data signal are transferred to the higher bit before the most significant bit to the least significant bit of said first digital output signal, the most significant bit of "0" being added to said first digital output signal.

3. A semiconductor integrated circuit device as set forth in claim 1, in which said second shifter is implemented by wirings arranged in such a manner that the bits of said m-bit input data signal are shifted by two bits toward the least significant bit for producing lower bits of said second digital code signal, higher two bits of "0" being added to said second digital output signal.

4. A semiconductor integrated circuit device as set forth in claim 1, further comprising e) a round-off circuit coupled with said output port of said selector unit for producing a third digital output signal indicative of an integral part of one of said m-bit input data signal, said first digital output signal and said second digital output signal.

5. A semiconductor integrated circuit device for a linear quantization and an inverse quantization selectively entering a coding phase and a decoding phase of operation, comprising:
   a) a means for assigning bits of an (n+2) bit primary digital code signal indicative of a coefficient to bits of an n-bit secondary digital code signal;
   b) a first shifter coupled with a data input port, and operative to divide the value indicated by an m-bit input data signal at said data input port by two for producing a first digital output signal indicative of the half of said value;
   c) a multiplier having a first input port supplied with said m-bit input data signal and a second input port supplied with lower (n−2) bits of said n-bit secondary digital code signal, and operative to multiply the value indicated by said m-bit input data signal by a multiplier indicated by said lower (n−2) bits, said n-bit secondary digital code signal in said coding phase being at least two bits wider than a standard digital code signal indicative of a theoretical quantize coefficient used in said decoding phase, higher two bits of said n-bit secondary digital code signal being indicative of "0" in said decoding phase;
   d) a second shifter coupled with said multiplier, and operative to divide the product of the multiplication carried out by said multiplier by four for producing a second digital output signal indicative of the quarter of said product;
   e) a means for producing a two-bit control signal from the higher two bits of said n-bit secondary digital code signal; and
   f) a selector unit having three input ports respectively coupled with said data input port, said first shifter and said second shifter, and responsive to said two-bit control signal for selectively coupling said three input ports with an output port thereof, said selector unit being operative to transfer said m-bit input data signal to said output port when only the higher bit of said two-bit control signal is indicative of "1", said selector unit being operative to transfer said first digital output signal to said output port when only the lower bit of said two-bit control signal is indicative of "1", said selector unit being operative to transfer said second digital output signal to said output port when said two bits of said two-bit control signal are indicative of "0".

* * * * *